US012173935B2

(12) United States Patent
Shanmugam et al.

(10) Patent No.: US 12,173,935 B2
(45) Date of Patent: Dec. 24, 2024

(54) INCREASING A FLOW RATE OF OIL INTO A COMPRESSOR OF A REFRIGERATION ASSEMBLY

(71) Applicant: Hill Phoenix, Inc., Conyers, GA (US)

(72) Inventors: Senthilkumar Kandappa Goundar Shanmugam, Covington, GA (US); Joshua Meduoye, Atlanta, GA (US); Manu Mital, Covington, GA (US)

(73) Assignee: Hill Phoenix, Inc., Conyers, GA (US)

( * ) Notice: Subject to any disclaimer, the term of this patent is extended or adjusted under 35 U.S.C. 154(b) by 0 days.

(21) Appl. No.: 18/537,446

(22) Filed: Dec. 12, 2023

(65) Prior Publication Data

US 2024/0110735 A1    Apr. 4, 2024

Related U.S. Application Data

(62) Division of application No. 17/467,614, filed on Sep. 7, 2021, now Pat. No. 11,874,033.

(51) Int. Cl.
*F25B 31/00*    (2006.01)
(52) U.S. Cl.
CPC ................... *F25B 31/004* (2013.01)
(58) Field of Classification Search
CPC ........ F25B 2500/16; F25B 5/02; F25B 9/008; F25B 2309/061; F25B 2400/075;
(Continued)

(56) References Cited

U.S. PATENT DOCUMENTS

| 11,874,033 B2 | 1/2024 | Shanmugam et al. |
| 2013/0000339 A1 | 1/2013 | Shimazu et al. |

(Continued)

FOREIGN PATENT DOCUMENTS

| CN | 102575884 A | 7/2012 | |
| CN | 102575884 B * | 5/2015 | ............ F25B 31/004 |

(Continued)

OTHER PUBLICATIONS

Pdf is translation of foreign reference JP 2000038990 A (Year: 2000).*

(Continued)

*Primary Examiner* — Len Tran
*Assistant Examiner* — Kamran Tavakoldavani
(74) *Attorney, Agent, or Firm* — Fish & Richardson P.C.

(57) ABSTRACT

A method includes receiving, by a processing device and from a variable frequency drive coupled to one or more compressors, operation information of the one or more compressors. The method also includes comparing the operation information of the one or more compressors to an operation threshold and determining that the operation information satisfies the operation threshold. The method also includes changing, based on the determination that the operation information of the one or more compressors satisfies the operation threshold, an operation parameter of a component of the refrigeration system. Changing the operation parameter increases at least one of: (i) a velocity of a working fluid in a piping assembly fluidly coupled to the one or more compressors, or (ii) a flow rate of an oil in the piping assembly flowing into the one or more compressors.

20 Claims, 5 Drawing Sheets

(58) Field of Classification Search
CPC .............. F25B 2400/13; F25B 2500/31; F25B 2600/025; F25B 2600/111; F25B 2600/17; F25B 41/39; F25B 41/38
See application file for complete search history.

(56) References Cited

U.S. PATENT DOCUMENTS

| | | | | |
|---|---|---|---|---|
| 2016/0146522 | A1* | 5/2016 | Hung | F25B 49/02 62/207 |
| 2018/0156499 | A1* | 6/2018 | Lifson | F25B 41/00 |
| 2020/0064037 | A1* | 2/2020 | Ferretti | F25B 49/02 |
| 2020/0247219 | A1* | 8/2020 | Kleinow | B60H 3/0085 |
| 2023/0077084 | A1 | 3/2023 | Shanmugam et al. | |

FOREIGN PATENT DOCUMENTS

| | | |
|---|---|---|
| EP | 3659838 | 6/2020 |
| EP | 3748266 | 12/2020 |
| JP | 2000-038990 | 2/2000 |
| JP | 2000038990 A * | 2/2000 |

OTHER PUBLICATIONS

Pdf is translation of foreign reference CN 102575884 B (Year: 2015).*

International Preliminary Report on Patentability in International Appln. No. PCT/US2022/076072, mailed on Mar. 21, 2024, 7 pages.

International Search Report and Written Opinion in International Appln. No. PCT/US2022/076072, dated Dec. 15, 2022, 10 pages.

\* cited by examiner

INCREASING A FLOW RATE OF OIL INTO A COMPRESSOR OF A REFRIGERATION ASSEMBLY

CROSS-REFERENCE TO RELATED APPLICATION

This application is a divisional application of and claims the benefit of priority to U.S. application Ser. No. 17/467,614, filed on Sep. 7, 2021, the contents of which is hereby incorporated by reference.

FIELD OF THE DISCLOSURE

This disclosure relates to refrigeration systems, and particularly to oil management in refrigeration systems.

BACKGROUND OF THE DISCLOSURE

Refrigeration systems are used to cool spaces such as refrigerators, freezers, coolers, and display cases. Refrigeration systems rely on refrigeration cycles of a refrigerant that alternately absorbs and rejects heat as the refrigerant is circulated through the system. Refrigeration systems include one or more compressors that compress the working fluid to increase the pressure of the fluid as part of the refrigeration cycle. Compressors may use oil for different purposes, such as to lubricate components of the compressor. The oil can mix with the working fluid and leave the compressor, which can affect the operation of the compressor and reduce the heat transfer and energy efficiency of the working fluid. The refrigeration system can use different piping configurations to return the oil to the compressor. Methods and equipment for returning the oil to the compressor are sought.

SUMMARY

Implementations of the present disclosure include a method that includes receiving, from a variable frequency drive of one or more compressors of a refrigeration system and by a processing device, operation information of the one or more compressors. The method also includes comparing, by the processing device, the operation information of the one or more compressors to an operation threshold. The method also includes determining, by the processing device and based on the comparison, that the operation information of the one or more compressors satisfies the operation threshold. The method also includes changing, based on the determination that the operation information of the one or more compressors satisfies the operation threshold and by the processing device, an operation parameter of a component of the refrigeration system. Changing the operation parameter increases at least one of: (i) a velocity of a working fluid in a piping assembly fluidly coupled to the one or more compressors, or (ii) a flow rate of an oil in the piping assembly flowing into the one or more compressors.

In some implementations, the operation information includes a frequency of the one or more compressor, and changing the operation parameter includes changing an operation speed of the one or more compressors. In some implementations, the frequency includes a frequency of the one or more compressors over a period of time and the operation threshold includes a frequency threshold. The method further includes, before comparing the operation information to the operation threshold determining an average frequency of the compressor over a predetermined period of time, and determining that the operation information satisfies the operation threshold includes determining that the average frequency of the compressor is below the frequency threshold.

In some implementations, the piping assembly includes a suction line fluidly coupled to a fluid inlet of the one or more compressors. The method further includes, after changing the operation parameter, receiving, by the processing device and from one or more sensors fluidly coupled to the suction line, fluid information including a parameter of the working fluid in the suction line. The method also includes comparing, by the processing device, the parameter of the working fluid to a fluid parameter threshold. The method also includes determining, by the processing device and based on the comparison, that the parameter of the working fluid satisfies the fluid parameter threshold. The method also includes opening, by the processing device and based on the determination that the parameter of the working fluid satisfies the fluid parameter threshold, at least one of (i) a liquid injection valve in fluid communication with the suction line, or (ii) a gas injection valve in fluid communication with the suction line, chancing a temperature of the working fluid in a superheated state. In some implementations, the parameter of the working fluid includes a temperature or a pressure of the working fluid in the suction line, and the fluid parameter threshold includes (i) a respective temperature threshold of the working fluid that indicates a low load condition of the refrigeration system or (ii) a pressure threshold of the working fluid that indicates a low load conditions of the refrigeration system. Determining that the parameter of the working fluid satisfies the fluid parameter threshold includes determining that the parameter of the working fluid is at or below the fluid parameter threshold.

In some implementations, the piping assembly includes a suction line fluidly coupled to a fluid inlet of the one or more compressors. The method further includes, after changing the operation parameter, receiving, by the processing device and from one or more sensors fluidly coupled to the suction line, fluid information including a parameter of the working fluid in the suction line. The method also includes comparing, by the processing device, the parameter of the working fluid to a fluid parameter threshold. The method also includes determining, by the processing device and based on the comparison, that the parameter of the working fluid does not satisfy the fluid parameter threshold. The method also includes, upon determining that the parameter of the working fluid does not satisfy the fluid parameter threshold, repeating the steps of claim 1.

In some implementations, the piping assembly includes a suction line fluidly coupled to the one or more compressor, and changing the operation parameter includes changing a pressure set point of at least one of a flash tank of the refrigeration system or a gas cooler of the refrigeration system, increasing a speed of the working fluid flowing in the suction line.

In some implementations, further including, after changing the operation parameter, receiving, by the processing device and from one or more sensors of the refrigeration system, a discharge air temperature of an evaporator of the refrigeration system. The method also includes comparing, by the processing device, the discharge air temperature to a discharge air temperature threshold. The method also includes determining, by the processing device and based on the comparison, that the discharge air temperature satisfies the discharge air temperature threshold. The method also includes, upon determining that the parameter of the fluid satisfies the fluid parameter threshold, repeating the steps of claim 1.

In some implementations, the method also includes, after changing the operation parameter, receiving, by the processing device and from one or more sensors of the refrigeration system, a discharge air temperature of an evaporator of the refrigeration system. The method also includes comparing, by the processing device, the discharge air temperature to a discharge air temperature threshold. The method also includes determining, by the processing device and based on the comparison, that the discharge air temperature does not satisfy the discharge air temperature threshold. The method also includes resetting, by the processing device, a timer of the refrigeration system, the processing device configured to repeat the steps of claim 1 after a predetermined period of time indicated by the timer.

In some implementations, changing the pressure set point includes lowering a pressure set point of the flash tank or increasing a pressure set point of the gas cooler, increasing a speed of the working in the suction line.

In some implementations, the piping assembly includes a suction line fluidly coupled to the one or more compressor, and changing the operation parameter includes changing a suction set point of the refrigeration system, increasing a speed of the working fluid flowing in the suction line.

In some implementations, increasing the velocity of the working fluid includes increasing a flow rate of oil return into the one or more compressors.

In some implementations, the piping assembly extends from one or more evaporators of the refrigeration system to the one or more compressors, and changing the operation parameter includes changing the operation parameter to increase the velocity of the working fluid in the piping assembly flowing from the one or more evaporators to the one or more compressors.

In some implementations, the piping assembly includes a low temperature suction line and a medium temperature suction line. The one or more compressors includes a group of low temperature compressors and a group of medium temperature compressors, and the one or more evaporators includes a group of low temperature display cases fluidly coupled, through the low temperature suction line, to the group of low temperature compressors and a group of medium temperature display cases fluidly coupled, through the medium temperature suction line, to the medium temperature compressors, and changing the operation parameter includes changing the operation parameter to increase the velocity of the working fluid in at least one of the low temperature suction line of the medium temperature suction line.

In some implementations, the low temperature suction line includes a heat exchanger coil disposed inside the flash tank. The low temperature suction line includes a uniform diameter, and changing the operation parameter includes changing the operation parameter to increase the velocity of the working fluid flowing in the low temperature suction from the heat exchanger coil to the group of low temperature compressors.

In some implementations, the operation information includes an oil level in an oil separator fluidly coupled to the one or more compressors, and the operation threshold includes an oil level of the oil separator under low load conditions of the refrigeration system.

Implementations of the present disclosure include a method that includes obtaining a refrigeration system including one or more compressors, one or more evaporators, a piping assembly fluidly coupled to and interconnecting the one or more compressors to the one or more evaporators, and a working fluid configured to flow in the piping assembly from the one or more evaporators to the one or more compressors. The method also includes changing, based on an indication of reduced velocity of the working fluid along the piping assembly, an operation parameter of a component of the refrigeration system, thereby increasing at least one of: (i) a velocity of a working fluid in a piping assembly fluidly coupled to the one or more compressors, or (ii) a flow rate of an oil in the piping assembly flowing into the one or more compressors.

In some implementations, the one or more compressors includes a group of compressors and changing the operation parameter of the component of the refrigeration system includes at least one of: (i) increasing a frequency of a lead compressor of the group of compressors, (ii) lowering a pressure set point of a flash tank of the refrigeration system, (iii) increasing a pressure set point of a gas cooler of the refrigeration system, or (iv) lowering a suction pressure or temperature set point of the refrigeration system.

In some implementations, the piping assembly includes a suction line fluidly coupled to a fluid inlet of the one or more compressors. The method further includes, after changing the operation parameter: receiving, by the processing device and from one or more sensors fluidly coupled to the suction line, fluid information including a temperature or pressure of the working fluid in the suction line near the fluid inlet of the one or more compressors. The method also includes comparing, by the processing device, the parameter of the working fluid to a fluid parameter threshold. Then method also includes determining, by the processing device and based on the comparison, that the parameter of the working fluid satisfies the fluid parameter threshold. The method also includes opening, by the processing device and based on the determination that the parameter of the working fluid satisfies the fluid parameter threshold, at least one of (i) a liquid injection valve in fluid communication with the suction line, or (ii) a gas injection valve in fluid communication with the suction line, chancing a temperature of the working fluid in a superheated state.

Implementations of the present disclosure include a system that includes at least one processing device a memory communicatively coupled to the at least one processing device. The memory stores instructions which, when executed, cause the at least one processing device to perform operations that includes receiving, by the at least one processing device and from one or more sensors or a VFD of a refrigeration system, operation information of one or more compressors of the refrigeration system. The operations also include comparing, by the processing device, the operation information of the one or more compressors to an operation threshold. The operations also include determining, by the processing device and based on the comparison, that the operation information of the one or more compressors satisfies the operation threshold. The operations also include changing, based on the determination that the operation information of the one or more compressors satisfies the operation threshold and by the processing device, an operation parameter of a component of the refrigeration system, increasing at least one of: (i) a velocity of a working fluid in a piping assembly fluidly coupled to the one or more compressors, or (ii) a flow rate of an oil in the piping assembly flowing into the one or more compressors.

Particular implementations of the subject matter described in this specification can be implemented so as to realize one or more of the following advantages. For example, the refrigeration system of the present disclosure can increase the flow rate of the oil to the compressor while simplifying the piping design and assembly. The refrigeration control system of the present disclosure can allow the piping assembly to have a common line size or a small number of line sizes for a wide range of capacity points, which can reduce design, manufacturing, and installation costs.

DETAILED DESCRIPTION OF THE DISCLOSURE

Oil logging in the suction lines of a refrigeration system may happen during low-load operating conditions (e.g., during winter months and at night). To reduce or prevent oil logging in the suction lines and simplify the piping design, a refrigeration system with demand oil return logic and with generally uniform line sizing can be implemented.

Figure 1:
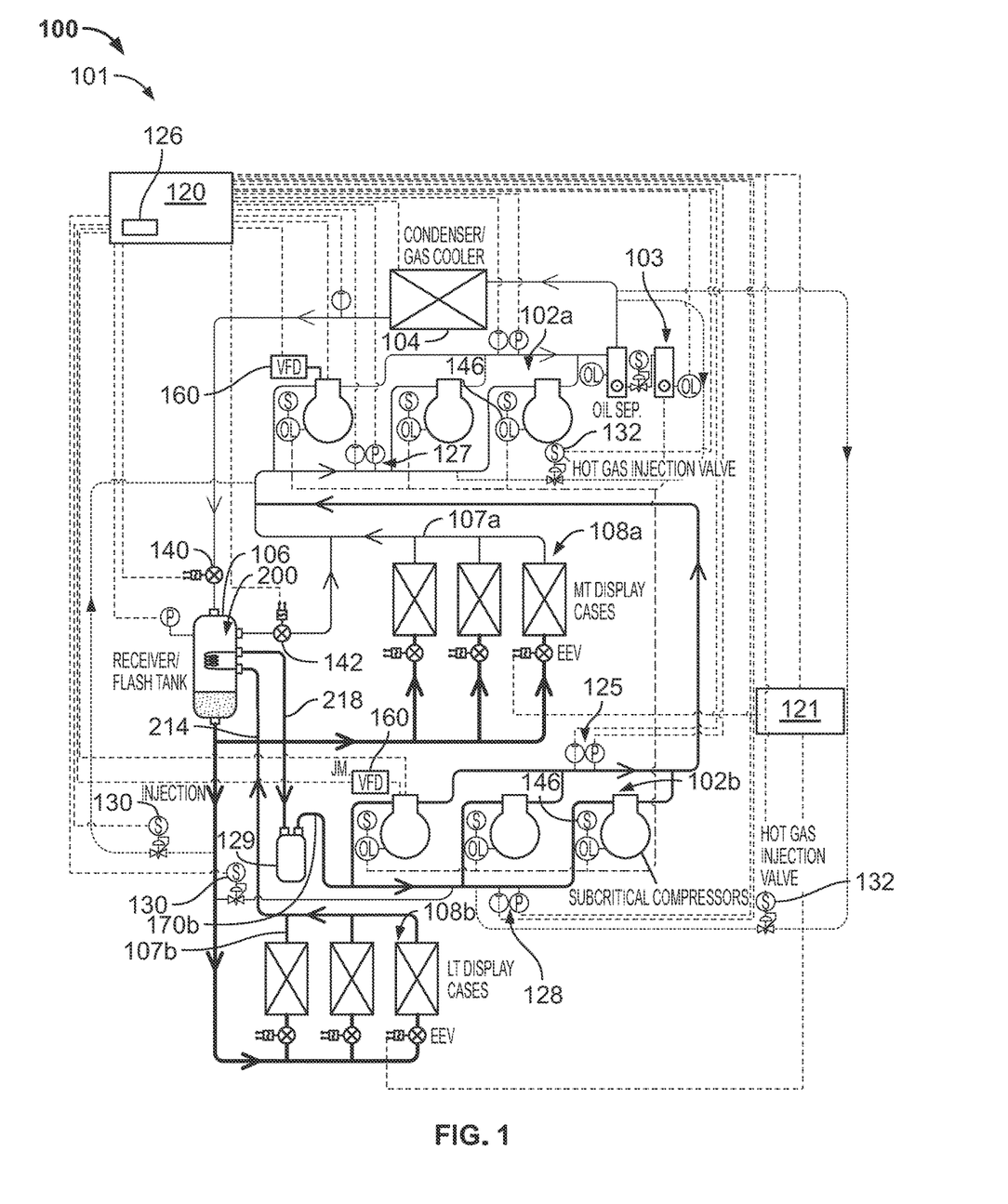
FIG. 1 is a schematic diagram of a refrigeration system according to implementations of the present disclosure.

FIG. 1 shows a schematic diagram (e.g., a piping and instrumentation diagram) of a refrigeration system or assembly 100. The refrigeration system 100 can be e.g., a commercial $CO_2$ refrigeration system, an ammonia refrigeration system, or a chilled water refrigeration system. The refrigeration system 100 can be a basic system with one compressor or a group of compressors (e.g., transcritical compressors, subcritical compressors, or a combination of the two). The refrigeration system 100 can include one evaporator or a group of evaporators (e.g., medium-temperature display cases, low-temperature display cases, or a combination of the two).

As shown in FIG. 1, the refrigeration system 100 can include two types of compressors or groups of compressors and two types of evaporators or groups of evaporators. For example, the refrigeration system 100 can include two groups of compressors and two groups of evaporators. Specifically, the refrigeration system 100 includes a first compressor or group of compressors 102a (e.g., one or more transcritical compressors or medium temperature compressors) and a second compressor or group of compressors 102b (e.g., one or more subcritical compressors or low temperature compressors). The refrigeration system 100 also includes a first evaporator or group of evaporators 108a, (e.g., one or more medium temperature evaporators), and a second evaporator or group of evaporators 108b (e.g., one or more low temperature evaporators). The medium-temperature evaporators 108a can include, for example, refrigerated display cases that display medium-temperature merchandise such as non-frozen products, and the low-temperature display cases 108b can include, for example, refrigerated display cases that display low-temperature merchandise such as frozen products.

The refrigeration system 100 can also include a refrigeration control system 101, a gas cooler or condenser 104, a receiver tank 106 (e.g., a flash tank or refrigerant liquid vapor separator), one or more oil separators 103, one or more accumulators 129, and multiple fluid lines and valves fluidly connected to the respective equipment of the refrigeration system 100. The refrigeration system 100 also includes sensors and one or more processing devices 120 and 121 communicatively or electrically coupled to respective equipment of the refrigeration system 100.

Both groups of evaporators 108a and 108b are fluidly connected to the flash tank 106 to receive a portion of the working fluid from the flash tank 106. The low-temperature suction line 107b of the low-temperature evaporators 108b is connected to the flash tank 106 to send fluid to the flash tank 106. The subcritical compressors 102b receive a vapor phase of the working fluid from the low-temperature evaporators 108b. The transcritical compressors 102a receive a vapor phase of the working fluid from the medium-temperature evaporators 108a and from the subcritical compressors 102b.

During an exemplary refrigeration cycle, medium-temperature discharge gas (or liquid and gas) flows from the gas cooler 104 to the receiver tank 106. Before reaching the receiver tank 106, a high pressure control valve 140 can change (e.g., reduce) the pressure of the medium-temperature discharge gas (or high-pressure condensate) to increase the amount of liquid phase of the working fluid. A first portion of the liquid phase of the working fluid flows from the tank 106 to the low-temperature evaporators 108b, with the working fluid passing first through respective expansion valves. A second portion of the liquid phase of the working fluid flows from the tank 106 to the medium-temperature evaporators 108a, with the working fluid passing first through respective expansion valves. After passing through the low-temperature evaporators 108b, the working fluid, as a low-temperature suction gas, flows through the low-temperature suction line or lines 107b to the receiver tank 106, and from the tank 106 to the subcritical compressors 102b. The suction line 107b can be fluidly coupled to the accumulator 129 that can meter or prevent or decrease the flow of fluid refrigerant and oil back to the compressors 102b. The working fluid, as a low-temperature discharge gas, flows from the subcritical compressors 102b to mix with the medium temperature suction gas that flows from the medium-temperature evaporators 108a to the transcritical compressors 102a. The medium temperature suction gas flows through a medium temperature suction line 107a to the transcritical compressors 102a. To finish the cycle, medium temperature discharge gas flows from the transcritical compressors 102a to the gas cooler 104.

The oil separators 103 can separate some or all the oil from the refrigerant to flow the oil back to the transcritical compressors 102a and subcritical compressors 102b. The rest of the oil can flow to the suction lines 107b and 107a, and the processing devices 120 and 121 can control different equipment of the system 100 to flow such oil back to the compressors 102a and 102b.

The flash tank 106 separates a liquid phase of the working fluid from a vapor phase of the working fluid. The flash tank 106 can store a portion of the liquid phase and supply the rest to the evaporators 108a and 108b. The receiver tank 106 supplies the separated vapor (e.g., flash gas) to the medium temperature suction line 107a of the transcritical compressors 102a. The separated vapor can pass through a pressure control or regulating valve 142 (e.g., a flash gas bypass valve) that can change the pressure of the vapor. Additionally, the pressure control valve 142 can help regulate the pressure of the flash tank 106.

A pressure control valve or regulating valve 140 (e.g., a high pressure control valve) can regulate the pressure of the gas cooler 104. Both valves 140 and 142 can together control the pressure of the flash tank 106. The compressed working fluid from the subcritical compressors 102b is fed to the medium temperature compressor suction line 107a. The medium temperature suction gas from the medium temperature display cases 108a mixes with the flash gas and those gases mix with the compressed working fluid from the subcritical compressors 102b. Such mixture is flown to the transcritical compressors 102a to begin a new cycle.

To prevent or reduce a low super heat in the suction lines 107a and 107b, hot gas can be injected form a medium temperature discharge to the medium temperature suction line 107a and to the low temperature suction line 107b. To prevent or reduce a high superheat in the suction lines, liquid refrigerant can be injected from a liquid supply to the medium temperature suction line 107a and to the low temperature suction line 107b.

The low temperature suction line 107b can include a supply line 214 that supplies the working fluid to the receiver tank 106 and a return line 218 that returns or flows the working fluid from the receiver tank 106 to the subcritical compressors 102b. The low temperature suction line 107b can include or be fluidly connected to a heat exchanger 200 disposed inside the receiver tank 106. The working fluid inside the heat exchanger 200 transfers heat through a heat transfer surface (e.g., a coil surface) of the heat exchanger 200 to the liquid or condensate inside the receiver tank 106. In some implementations, the medium temperature suction line 107a can have or be connected to a similar heat exchanged inside the receiver tank 106.

The oil separators 103 can help convey oil back to the compressors 102, but the oil that escapes the separators 103 can accumulate in the suction lines 107b and 107a during low load conditions of the system 100. The heat exchanger 200 inside the flash tank 106 can include double risers and P-traps to help flow the oil back to the compressors. In addition to or instead of relying on the heat exchanger to return the oil back to the compressors, a computer-implemented control system 101 can be used to flow the oil back to the compressors. As further described in detail below with respect to FIGS. 3-4, control system 101 uses the processing devices 120 and 121 to control the equipment of the refrigeration system 100 to flow the oil back to the compressors.

The working fluid may include a mixture of refrigerant and oil that, during low-load conditions, may leave behind the oil which then accumulates along the tubing (e.g., due to the relatively low velocity of the refrigerant). The refrigeration system 100 can be considered to run at low-load conditions when the system operates at about 5% to 20% of the total load capacity (e.g., rated load). For example, if the refrigeration system 100 is designed to remove the heat load of 100,000 BTUs per hour (BTUH), then the system is considered as running under low load conditions from about 5,000 BTUH to 20,000 BTUH. Such conditions can be experienced, for example, during winter days and during times of low foot traffic (e.g., during night time). During this time, not all compressors may run and one compressor may run at low speed. Low load conditions causes the velocity in the suction lines 107a and 107b to decrease. During such conditions, carried over oil can be stagnant in the evaporator coil over long periods of time (e.g., 24 hour or more). At this time, the processing device can use demand oil return control logic to forcefully pull the oil from the evaporator coils and flow the oil back to the compressors. In some implementations, the use of control logic allows the suction lines 107a and 17b to have a uniform diameter or fewer changes in diameter than other refrigeration systems (e.g., two different diameters).

During low load conditions, the vapor phase of the working fluid can be running at a speed at which the velocity of the vapor in the pipe is too low to maintain the oil entrained to return the oil back to the compressor. This may result in oil deposits or clogs within the refrigeration system piping or components. To help return the oil back to the compressor 102a or 102b, the refrigeration control system 101 increase the speed of the refrigerant to have enough friction with the oil to return the oil back to the compressor. To increase the velocity of the refrigerant, the processing device 120 can selectively control or change operating parameters of different components of the refrigeration system 100.

The oil that leaves the compressors 102b and 102a can be lubrication oil from the crankcase of the compressors. Because some refrigerants such as $CO_2$ are miscible with oil, the refrigerant mix with the lubrication oil as the refrigerant flows through the compressors. Thus, the compressors can discharge the high pressure and high temperature working fluid with some carried over oil (e.g., about 0.2% to 5% of oil is carried over of total mass flow). During normal or full load operation, the carried over oil often returns to the compressors through the suction lines. A velocity range for the discharge line during normal operation can be between about 1000 FPM to 2500 FPM. For example, a velocity range for the medium temperature suction line 107a during normal operation can be between about 700 FPM to 2500 FPM, and a velocity range for the low temperature discharge line 107b during normal operation can be between about 1000 FPM to 2500 FPM. During low load operation, the velocities can be lower than the normal velocities, which causes the oil to stay in the evaporator coil.

The refrigeration control system 101 includes one or more processing devices 120 and 121 (e.g., computer processors with controllers), multiple sensors or groups of sensors 125, 127, 128, and 146, and a triggering mechanism 126, such as an algorithm or program or software implemented with the processing devices. The triggering mechanism can be a timer, a clock, a thermostat, or any device or algorithm that can trigger the processing device based on time intervals, predetermined times of the day or seasons, ambient or indoor temperatures, and other related parameters.

The sensors 125, 127, 128, and 146 can include, without limitation, pressure sensors (e.g., pressure transducers), temperature sensors, oil level sensors, humidity sensors, and vibration sensors. For example, a first group of pressure and temperature sensors 127 is coupled to the medium temperature suction line 107a, a second group of pressure and temperature sensors 128 is coupled to the low temperature suction line 107b, and a third group of pressure and temperature sensors 127 is coupled to the discharge gas line that connects the subcritical compressors 102b to the medium temperature suction line 107a. Oil level sensors 146 with or without solenoid valves can be coupled to each compressor to detect a level of oil within each compressor.

In some implementations, the processing devices 120 and 121 can be implemented as one or more processors, computers, microcontrollers, or a combination thereof. For example, the first processing device 120 can include a rack controller and the second processing device 121 can include a case controller. The processing devices 120 and 121 can be part of a single or separate electrical control panels. In some implementations, the processing devices can be implemented as a distributed computer system disposed partly at the compressors (or some other equipment of the system) and partly at an electrical control panel. The computer system can include one or more processors and a computer-readable medium storing instructions executable by the one or more processors to perform the operations described here. In some implementations, the processing devices 120 and 121 can be implemented as processing circuitry, firmware, software, or combinations of them. The processing devices 120 and 121 can include a building management or automation system (BMS). The processing devices 120 and 121 can transmit signals and control the multiple components of the refrigeration system 100 and control system 101 to change a velocity of the working fluid along the piping assembly 107.

The second processing device 121 can control the expansion valves of the evaporators 108a and 108b and the first processing device 120 can control a hot gas injection valve 132 connected to a line extending from or near an inlet of the gas cooler 104 to the low temperature suction line 107b. The first processing device 120 can control the rest of the valves, sensors, gas cooler, variable frequency drives (VFDs) of the compressors, and other equipment of the refrigeration system 100. Alternatively, the system can only include one processing device 120 that controls all of the components of the refrigeration system 100.

In some implementations, the refrigeration system 100 also includes liquid injection valves 130 and a gas injection valves 132. The liquid injection valves 130 and a gas injection valves 132 can be used to change a temperature of the suction lines 107a and 107b. For example, the processing device 120 can calculate a super heat from pressure and temperature information received from the sensors 127 and 128. If such temperature satisfies a high super heat temperature threshold, the processing device 120 can open one or both of the liquid injection valves 130 to inject liquid when the super heat is high in the suction lines. Conversely, if such temperature satisfies a low super heat temperature threshold, the processing device 120 can open one or both of the hot gas injection valves 132 to inject hot gas when the super heat is low in the suction lines.

Additionally, the processing device 120 can control the liquid injection valves 130 and the gas injection valves 132 based on feedback from the compressors 102a and 102b, which may include speed and timing of the compressors. For example, if one or more of the compressors are running at low speed (e.g., about 30 Hz for more than 24 hours), there is a possibility of oil logging in the evaporator coil. Upon determining that the compressors have been running at or below a predetermined frequency for a predetermined period of time, the processing device 120 can control a respective VFD 160 associated with the desired compressor or group of compressors to increases the compressor's speed. The increment of the compressor's speed can bring the logged oil back to the compressor.

Figure 2:
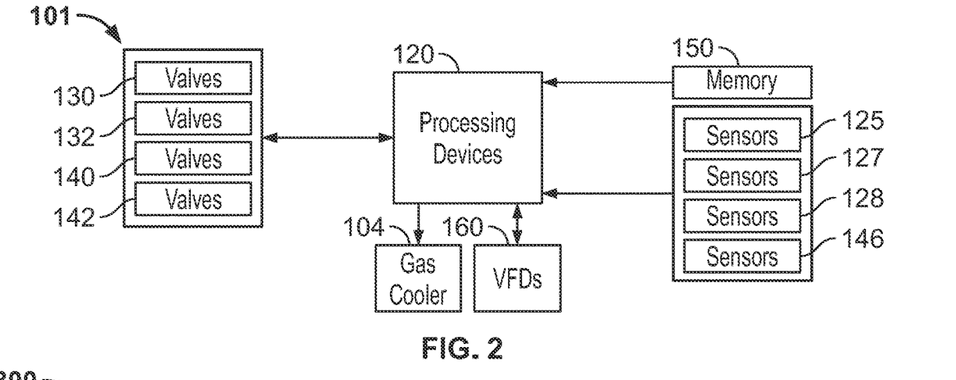
FIG. 2 is a block diagram of a control system for the refrigeration system according to implementations of the present disclosure.

FIG. 2 shows a block diagram of the refrigeration control system 101. The processing device 120 (e.g., the first processing device 120 in FIG. 1 or a combination of the first and second processing devices 120 and 121) receive inputs from sensors 125, 127, 128, and 146 to control, based on the input from the sensors, at least one of the liquid injection valves 130, the gas injection valves 132, the pressure control valves 140, the bypass valves 142, the gas cooler 104, the VFDs 160, or other components of the refrigeration system 100 to increase the speed of the working fluid.

The processing device 120 can be communicatively coupled to a memory 150 that stores instructions that the processing device 120 can execute to make determinations, based on the information received from the sensor or other components, to return the oil back to the compressor 102a or 102b. For example, the processing device 120 can compare the information received from the sensors or other components to a threshold (e.g., an operation threshold) to determine if the processing device 120 needs to increase the speed of the working fluid. The different parameters can represent information such as operating parameters of the compressor, operating parameters of the gas cooler 104, operating parameters of the flash tank 106, operating parameters of the valves, or operating parameters of other components of the system. The processing device 120 changes, based on the comparison, one or more operating parameter of one or more component of the refrigeration system 100 to increase the speed of the working fluid.

For example, the processing device 120 can increase an operating speed of the compressors 102a and 102b or lower a set point (e.g., a temperature set point or a suction pressure set point) of the refrigeration system, or a pressure set point of the flash tank 106 or the gas cooler 104. An exemplary set point may range from 5° F. to 30° F. for the medium temperature suction group and −5° F. to −30° F. for the low temperature suction group. For example, if the medium temperature suction is set at 15° F., the processing device 120 can lower the medium temperature suction to 5° F. during the low load condition, which can increase the refrigeration demand and force the compressor to run at full speed. If the compressors are forced to run at full speed, the suction flow rate can increase, which helps return the oil from evaporator to compressors.

In an exemplary implementation, the processing device 120 can set the medium temperature suction group to run at 15° F. (based on the temperature set point), with the corresponding suction pressure being at 375.8 PSIG. Either temperature or pressure can be used as the set point. The processing device 120 or an operator can run the system at such set point for a set period of set time (e.g., 24 hours), during which the refrigeration system 100 is running at low speed. The processing device 120 can lower, based on determining that the system is running at low speed, the suction set point to 13° F. Based on the change in demand, the processing device 120 controls the compressors to run and reduce the temperature and pressure to 13° F. and 363.3 PSIG respectively.

In another exemplary implementation, the processing device 120 can lower, based on a predetermined load condition, the flash tank set point from 36.5° F./528 PSIG to 33° F./498.5 PSIG. The pressure in the suction lines is lower than the pressure of the flash tank 106. To lower the pressure of the flash tank 106, the processing device 120 can open the flash gas bypass valve 142 to flow the fluid from the flash tank to the suction line 107a, lowering the flash tank pressure and increasing the suction pressure. With the suction pressure higher, the compressors are forced to run at full speed (or increased speed) to bring down the suction pressure to the suction set point.

In another exemplary implementation, the processing device 120 can increase, based on a predetermined load condition, the gas cooler pressure set point from 1105 PSIG to 1155 PSIG. The processing device 120 increases the pressure of the gas cooler 104 by opening or closing the high pressure valve 140 and by controlling the speed of the compressors and of the gas cooler fans. The gas cooler pressure set point can be variable based on the ambient temperature. The gas cooler pressure set point can be is controlled in a subcritical operating condition and in a transcritical operating condition. In the subcritical condition, pressure and temperature are related and controlled together, and in the transcritical condition, pressure and temperature are not related and are controlled independently. Increasing the gas cooler pressure set point forces the gas cooler fan to turn off or slow down to get to 1155 PSIG and can force the compressors to run to increase the gas cooler pressure. After the pressure setpoint of the gas cooler 104 increases, the processing device 120 can set the system back to a normal or standard set point. With the pressure of the gas cooler 104 high, the high-pressure valve 140 opens, which increases the pressure of flash tank 106. The increase in pressure of the gas in the flash tank causes the bypass valve 142 to open, increasing the suction pressure and forcing the compressors to run faster.

The processing device 120 can control the compressors 102*a* and 102*b* based on information received from the VFDs 160, from the compressors 102*a* and 102*b*, or from any of the sensors 125, 127, 128, and 146. For example, the processing device 120 can receive (e.g., in real time or near real time), from the VFDs 160 (or directly from a motor or another component of the compressor 102*a* and 102*b*), operation information such as the operating frequency or power of the compressor 102*a* and 102*b*. By determining the operating speed or frequency of the compressors, the processing device 120 can determine that the refrigerant velocity is too low and can then control components of the system to increase its speed. Additionally, the operation information can include information that represents how many compressors of a group of compressors are running. If a small enough number of compressors is running, the processing device 120 can determine that the refrigerant velocity is too low and can then control components of the system to increase the speed of the working fluid.

As used herein, the term "real-time" refers to transmitting or processing data without intentional delay given the processing limitations of a system, the time required to accurately obtain data, and the rate of change of the data. Although there may be some actual delays, the delays are generally imperceptible to a user.

Refrigerant velocity (and thus load conditions) can additionally be determined by other components such as the opening percentage of high pressure control, the opening percentage of the flash gas bypass control valve, number of expansion valves open at the display cases or evaporators, or electric current drawn at the rack by the compressors.

As shown in FIG. 1, in some cases, only a lead of a group of compressors 102*a* and 102*b* is connected to the VFD 160 (or to digital unloaders). The processing device 120 can send instructions to the VFD 160 to change a speed of the compressors. For example, the VFD 160 can change the speed of the lead compressor from 25 Hz to 75 Hz in both suction groups 102*a* and 102*b*. Other compressors may or may not have variable frequency drives to control the compressor speeds, but the processing device 120 can turn on or off those compressors based on the required load. Another parameter that the processing device 120 can change includes digital unloaders, which can change the compressor capacities from 10% to 100%.

Upon determining the operating frequency (e.g., the average operating frequency), the processing device 120 can compare the average operating frequency to an operation threshold. For example, the operation threshold can include an operating frequency or power of the compressor 102*a* or 102*b*. The operating frequency threshold can be a frequency of the compressor under normal or high load conditions. For example, the frequency threshold can include an average frequency of the compressor during normal business hours (e.g., during the day, and during summer months) when the refrigeration system works at a speed at which the oil returns normally to the compressor. In some implementations, the operating information can include an oil level in a reservoir of the compressor.

The group of oil separators 103 are equipped with oil level sensors. The group of oil separators 103 can include an oil separator and an oil reservoir separate from the oil separator. When the separator separates the oil from the discharge gas and oil level reaches the level sensor, the level sensor sends signal to the solenoid valve residing between the oil separator and oil reservoir. The signal is a signal to open and feed of the oil reservoir. The oil level sensor in the oil reservoir can also provide signal to the processing device 120 if there is low oil level in the reservoir. The compressors 102*a* and 102*b* can be equipped with oil level sensors 146 and with respective solenoid valves. If the oil level of a compressor is low, the processing device 120 activates the reservoir (e.g., the solenoid valve of the oil reservoir) to feed the compressors from the reservoir.

Figure 3:
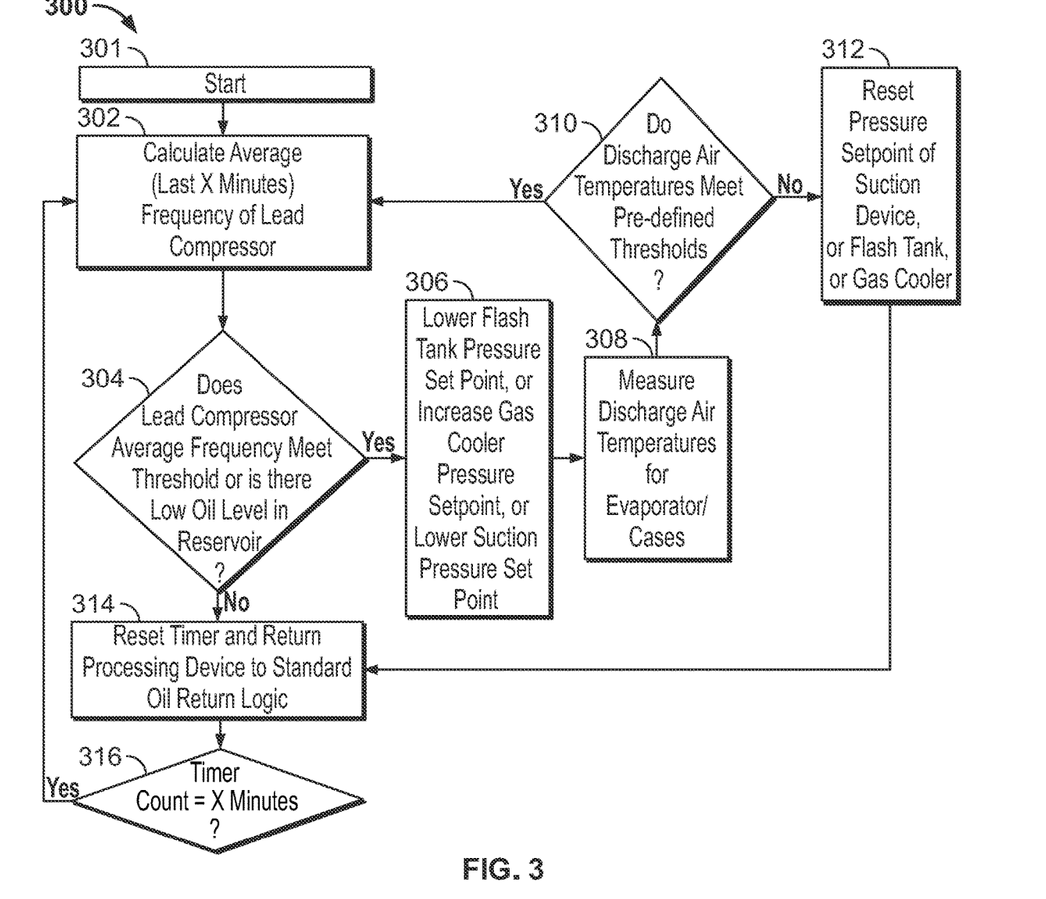
FIG. 3 is a decision flow diagram of a control system for the refrigeration system according to a first implementation of the present disclosure.

FIG. 3 shows a decision flow diagram 300 of the refrigeration control system 101. For example, the processing device 120 can control the refrigeration system 100 based on inputs and decisions made with respect to those inputs. In the first step 301, the refrigeration control system 101 starts by receiving input from the sensors to control components of the refrigeration system based on the sensor input. In step two 302, the processing device 120 calculates an average frequency of the compressor (e.g., a lead compressor). In some implementations, instead of or in addition to calculating the average frequency of the compressor 102*a* or 102*b*, the processing device 120 determines an oil level of the oil reservoir. In step three 304, the processing device 120 determines if the average frequency satisfies a threshold (e.g., an operating frequency threshold). The threshold can be a low operating frequency such as a frequency during low load conditions of the system 100. Satisfying the threshold can include operating at a frequency that is at or below the threshold.

In some implementations, instead of or in addition to determining if the average frequency satisfies the threshold, the processing device 120 can determine if the oil level of the oil reservoir satisfies an oil level threshold. The oil level threshold can be a low oil level that indicates that the refrigeration system is under low load conditions or that the compressor 102*a* or 102*b* needs to increase its oil level to operate more efficiently. Satisfying the oil level threshold can include having an oil level that is at or below the oil level threshold.

If the operating frequency threshold or the oil level threshold is not satisfied, the processor can wait a predetermined period of time to again calculate the average operating frequency of the compressor. In some implementations, if the processing device 120 determines that the parameters do not meet the thresholds, the processing device 120 can take step eight 314 by triggering mechanism (e.g., the timer). For example, the timer can cause the processing device 120 to begin the process again after a predetermined period of time. In step nine 316, the triggering mechanism can transmit or send input to the processing device 120 after a predetermined period of time to start calculating the frequency of the compressor again.

The triggering mechanism can be configured to trigger the processing device during the times of the day or seasons of the year when the refrigeration system is expected to run at low-load conditions. For example, the triggering mechanism 126 can trigger or activate the processing device 120 during the night when outdoor temperatures decrease and the refrigerators or freezers remain closed, or during winter months when the outdoor temperatures are relatively low. The triggering mechanism 126 can be manually or automatically set up based on room temperature information, weather information, or other related information.

If the processing device 120 determines that the operating frequency threshold or the oil level threshold is satisfied, the processing device 120 takes step four 306 by changing an operating frequency of a component of the refrigeration system 100 for a predetermined period of time. For example, the processing device 120 can determine an operating command and control, based on the operating command, an operating parameter of a component of the refrigeration system 100.

The operating command can include instructions to lower a pressure set point or the suction set point of the system 100. For example, after the processing device 120 determines that the operation information of the compressor 102a or 102b satisfies the threshold, the processor can lower the suction pressure set point or the pressure set point of the flash tank 106, or the gas cooler 104, or a combination of them. Thus, the operating command can include a set point operating command.

Referring back to FIG. 1, the flash tank 106 can have a pressure set point that ranges from about 30 bar to 90 bar. The pressure set point of the flash tank 106 can be set, for example, at 35 bar. Based on the configuration of the refrigeration system 100, the processing device 120 can lower the pressure set point of the flash tank 106 in one bar range or increments. For example, the processing device 120 can lower the pressure set point of the flash tank 106 from 34 bar to 33 bar, then from 33 bar to 32 bar. The suction set point may range from 5° F. to 30° F. for the medium temperature suction group and −5° F. to −30° F. for the low temperature suction group. For example, if the medium temperature suction is set at 15° F. for the application, once a low load condition is detected, the medium temperature suction can be set to 5° F., which increases the refrigeration demand and forces the compressors to run at faster (e.g., at full speed). Once the oil level reaches a normal level, the processing device 120 resents the pressure set point to normal operating condition.

Referring back to FIG. 3, to determine if the change in pressure set point has helped return the desirable amount of oil back to the compressors 102a or 102b, the system 100 can determine the oil levels or measure a discharge air temperature. For example, in step five 308, the sensors 124 measure a fluid parameter (e.g., discharge air temperature) of the evaporators 108a or 108b. The sensors transmit, to the processing device 120, the fluid parameter at the evaporator 108a or 108b (or refrigerator display cases) of the refrigeration system.

The discharge air temperature of the evaporators 108a or 108b is the temperature inside the evaporator or display case, or the temperature of the food inside the display case. For example, the evaporator can continuously discharge 15° F. air to maintain the food temperature at 20° F. in the evaporator or display case. If during load conditions the air inside the display case is 15° F., the expansion valve at the inlet of an evaporator coil can close to stop the working fluid from circulating in that particular display case. If this happens in the majority of display cases, the flow of refrigerant from the display cases to the compressors is partial or low enough to meet a low threshold that indicates low load conditions.

In step six 310, the processing device 120 can compare the temperature of the discharge air to a discharge air threshold. The threshold can include a temperature of the discharge air at the outlet of the evaporator under low load conditions, which indicates low velocity of the working fluid.

The processing device 120 can determine, based on the comparison, that the temperature of the discharge air satisfies the fluid parameter threshold. For example, the temperature of the discharge air can be at or below the threshold. In such cases, the velocity of the working fluid may be low enough to cause oil logging or accumulate in the piping assembly. Upon determining that the parameter of the fluid satisfies the fluid parameter threshold, the processing device 120 can go back to step two 302 by calculating the average operating frequency of the compressor 102a or 102b. Doing so can keep the suction pressure set point at the desired level until the working fluid reaches a desirable velocity or the oil reaches a desirable flow rate into the compressor.

If the processing device 120 can instead determines, based on the comparison, that the temperature of the discharge air does not satisfy the fluid parameter threshold, the processing device can take step seven 312 by resetting the set point. For example, the processing device 120 can reset the suction pressure or temperature set point, the pressure set point of the flash tank 106, or the pressure set point of the gas cooler 104. For example, the processing device 120 can determine a reset command and transmit the reset command to any of these components or valves to reset the set point. The processing device 120 can additionally reset the triggering mechanism to return the control system 101 to a standard oil return logic.

Figure 4:
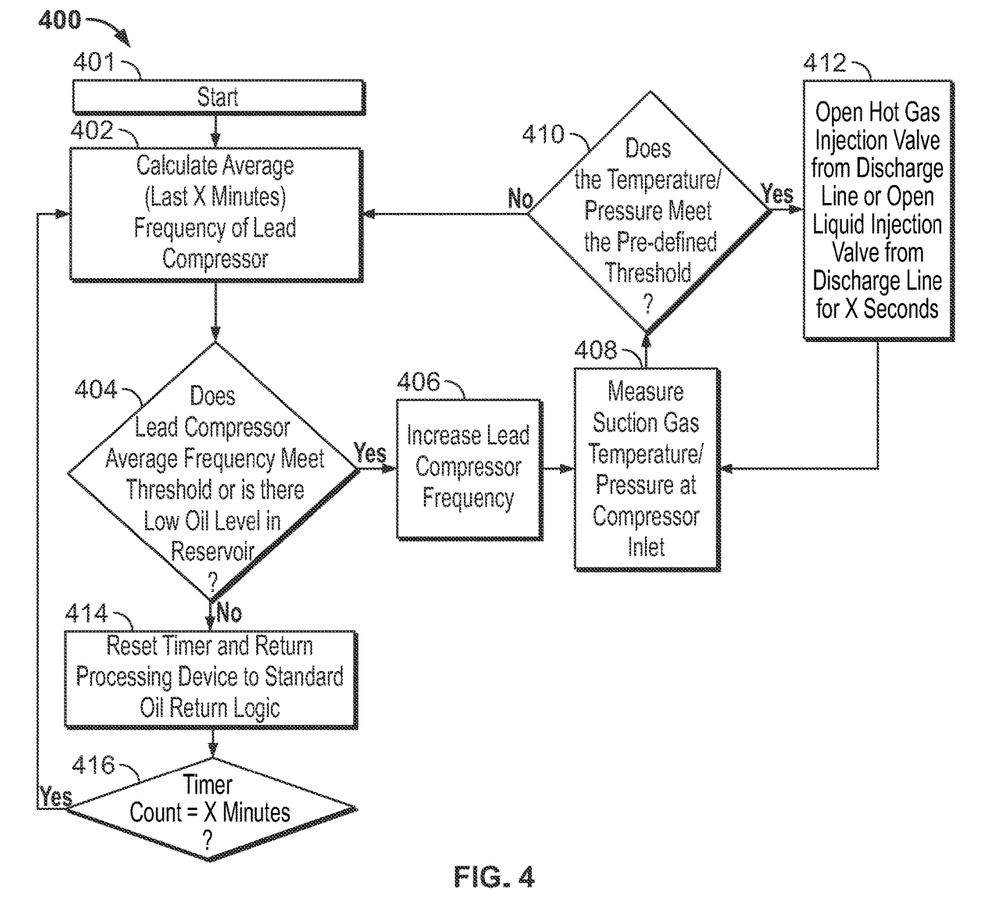
FIG. 4 a decision flow diagram of a control system for the refrigeration system according to a second implementation of the present disclosure.

FIG. 4 shows a decision flow diagram 400 of the refrigeration control system 101 similar to the decision flow diagram of FIG. 3, but used to control operating parameters of the compressors 102a or 102b. In step one 401, the processing device 120 starts the process by receiving sensor input. In step two 402, the processing device 120 calculates an average frequency of the compressor 102a or 102b. In step three 404, the processing device 120 then determines if the average frequency satisfies a threshold (e.g., an operating frequency threshold). If the operating frequency threshold (or the oil level threshold) is not satisfied, the processor 120 takes step 8 by resetting the timer and waiting a predetermined period of time (e.g., until the timer triggers the processing device again) to again calculate the average operating frequency of the compressor. In step four 406, if the processing device 120 determines that the operating frequency threshold is satisfied, the processing device 120 increases the operating frequency of the compressor 102a or 102b. The frequency of the compressor can be changed by the VFD. Increasing the operating frequency of the compressor can increase the velocity of the working fluid.

In step five 408, to determine if the increase in operating frequency of the compressor 102a or 102b has helped return the desirable amount of oil back to the compressor, the processing device 120 can receive, from a sensor 127 or 128 at or near the inlet of the compressor, fluid information that includes a parameter of a fluid at the inlet of the compressor. The parameter of the fluid can be a temperature or pressure of the working fluid at the inlet of the compressor.

When the compressor 102*a* or 102*b* is forced to run at full speed without there being a load requirement from the display cases, the suction pressure and temperature may go below the pre-defined set point/threshold, which can cause low superheat issues. In step four 406, the processing device 120 can force the compressor to run at full speed keeping while monitoring the suction pressure and temperature (steps five and six 408 and 410). If the pressure or temperature meets the threshold, the processing device 120 calculates the superheat to determine if the superheat is low (e.g., below 10° F.). If super the super heat is low (e.g., meets a superheat temperature threshold), then the processing device 120 takes step seven 412 by triggering the hot gas injection valve to open, which increases the super heat. The superheat is increased until the temperature is above the threshold, in which case the processing device 120 goes back to step two 402.

In step eight 414, if the processing device 120 determines in step three 404 that the parameters do not meet the threshold, the processing device 120 resets the triggering mechanism. In step nine 416, the processing device determines if a pre-determined period of time has passed to begin the process again.

The refrigeration control system 101 can operate using an intrusive or a non-intrusive method. For example, the intrusive method includes operating, based on the predefined set points, the refrigeration system 101 efficiently, in which case the system 100 may go into instable mode for a period of time (e.g., a few minutes). The non-intrusive method uses the same logic or steps that the intrusive method uses, but the processing device 120 uses additional proportional-integral-derivative (PID) logic to predict the low load conditions prior to occurring. When the processing device 120 predicts that the low load condition may occur, the processing device 120 can run the compressor 102*a* or 102*b* at full speed to return any oil logged in the evaporator coil. Additionally, the processing device 120 can, to conserve energy or otherwise increase efficiency, predict when a low load condition will be short enough to not require changing parameters of the system 100. For example, if the refrigeration system 100 is running at low load condition for 6 hours (e.g., during the night) and the processing device determines that load requirements will increase shortly (e.g., due to the store opening in the morning), the processing device 120 can wait a predetermined time period until the capacity requirement goes, forcing the compressor to run at full speed and in-turn return the oil back to the compressor without affecting the other parameters.

The methods and systems described herein help increase a velocity of the working fluid in the suction lines 107*a* or 107*b* (or other lines of the system 100). The increase in speed of the working fluid flows the oil back to the compressors 102*a* or 102*b*. Because the processing device 120 can help change the speed the working fluid in the piping assembly, the piping assembly (e.g., the suction lines 107*a* and 107*b*) can have pipes of a substantially equal diameter. The sizing of pipes can thus be "standardized" because the speed of the working fluid can be continuously changed by the processing device 120, instead of depending on the sizing of the pipes to achieve a desirable velocity of the working fluid.

Figure 5:
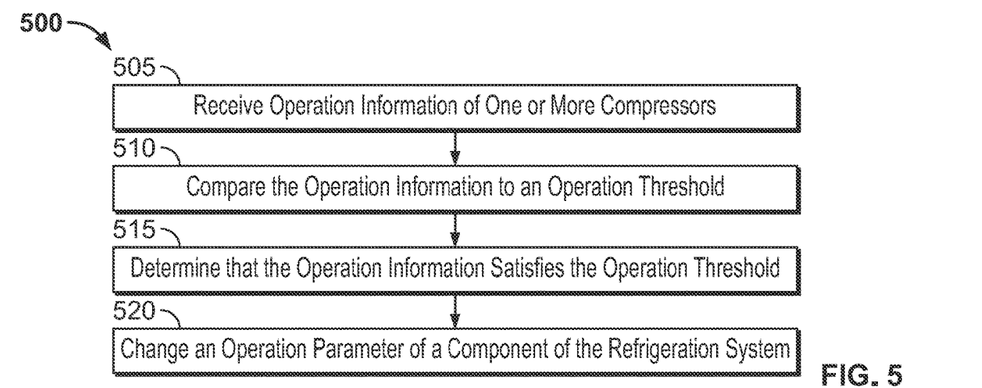
FIG. 5 is a flow diagram of an example method of increasing a velocity of a working fluid in a piping assembly according to a first implementation of the present disclosure.

FIG. 5 shows a flow diagram of an example method 500 of returning oil logged in the fluid lines of a refrigeration system (e.g., the refrigeration system 100 in FIG. 1). The method includes receiving, from a variable frequency drive of one or more compressors of a refrigeration system and by a processing device, operation information of the one or more compressors (505). The method also includes comparing, by the processing device, the operation information of the one or more compressors to an operation threshold (510). The method also includes determining, by the processing device and based on the comparison, that the operation information of the one or more compressors satisfies the operation threshold (515). The method also includes changing, based on the determination that the operation information of the one or more compressors satisfies the operation threshold and by the processing device, an operation parameter of a component of the refrigeration system, increasing at least one of: (i) a velocity of a working fluid in a piping assembly fluidly coupled to the one or more compressors, or (ii) a flow rate of an oil in the piping assembly flowing into the one or more compressors (520).

Figure 6:
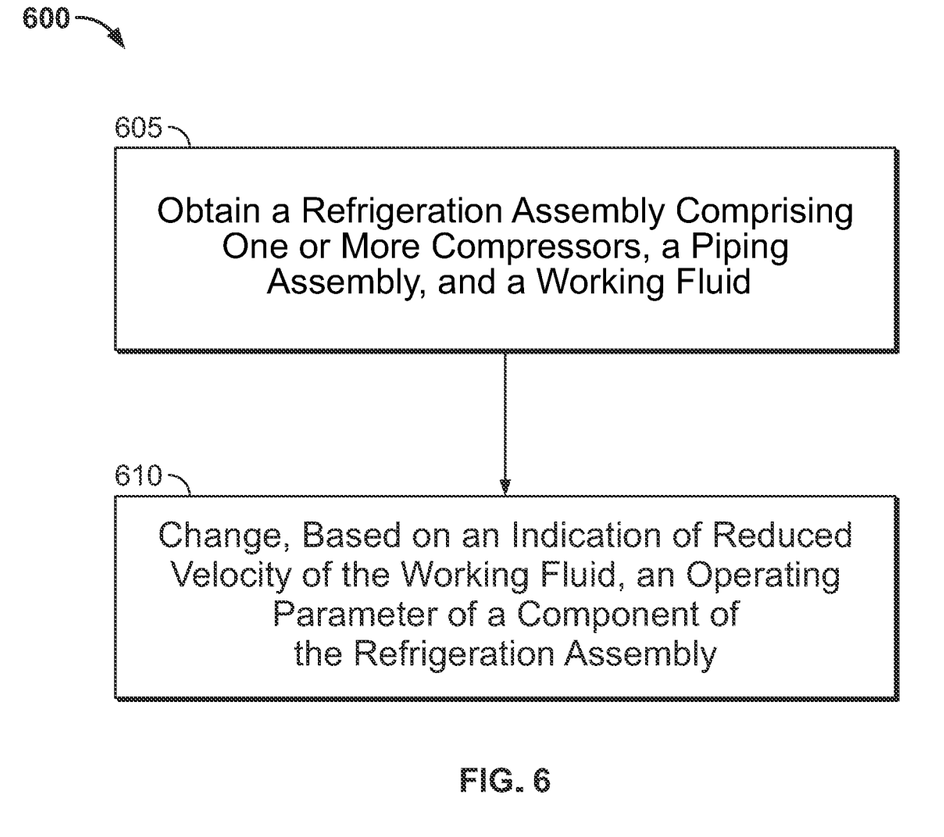
FIG. 6 is a flow diagram of an example method of increasing a velocity of a working fluid in a piping assembly according to a second implementation of the present disclosure.

FIG. 6 shows a flow diagram of a second example method 600 of retuning compressor oil to the compressor of a refrigeration system (e.g., the refrigeration system 100 in FIG. 1). The method includes obtaining a refrigeration system that includes one or more compressors, one or more evaporators, a piping assembly, and a working fluid (605). The method also includes changing, based on an indication of reduced velocity of the working fluid along the piping assembly, an operation parameter of a component of the refrigeration system. The change causes an increase of at least one of (i) a velocity of a working fluid in a piping assembly fluidly coupled to the one or more compressors, or (ii) a flow rate of an oil in the piping assembly flowing into the one or more compressors (610).

Figure 7:
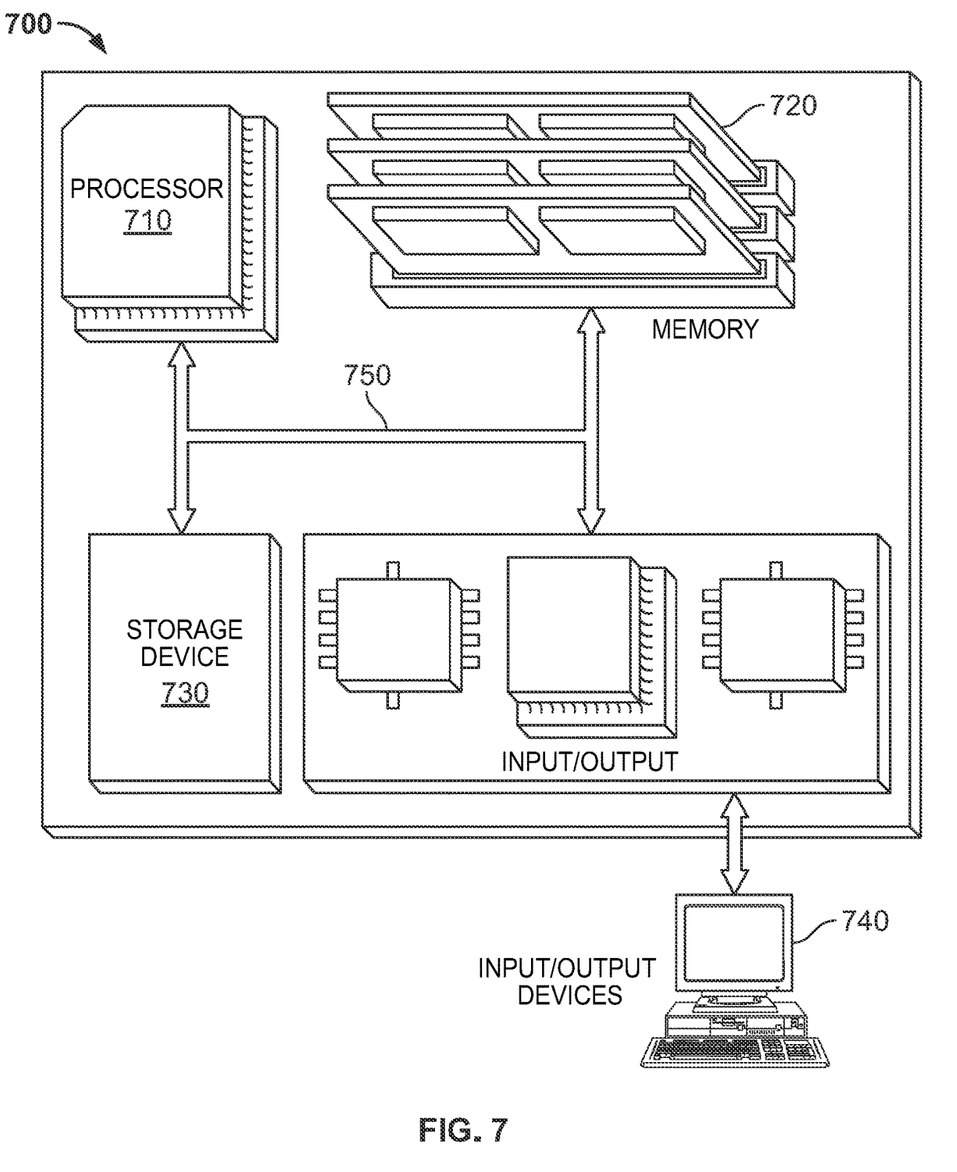
FIG. 7 is a schematic diagram of a computer system that may be applied to any of the computer-implemented methods and other techniques described herein.

FIG. 7 is a schematic illustration of an example processing device or controller according to the present disclosure. For example, the controller 700 may include or be part of the processing device 120 shown in FIGS. 1-2. The controller 700 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 may include or be part of the processing device 120 shown in FIGS. 1-4, and is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor or microprocessor or parametric controller. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, or a tape device.

The input/output device 740 provides input/output operations for the controller 700. In one implementation, the input/output device 740 includes a keyboard and/or pointing device. In another implementation, the input/output device 740 includes a display unit for displaying graphical user interfaces (e.g., a hand held device).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used herein, the terms "aligned," "substantially aligned," "parallel," or "substantially parallel" refer to a relation between two elements (e.g., lines, axes, planes, surfaces, or components) as being oriented generally along the same direction within acceptable engineering, machining, drawing measurement, or part size tolerances such that the elements do not intersect or intersect at a minimal angle. For example, two surfaces can be considered aligned with each other if surfaces extend along the same general direction of a device or component.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A system comprising:
   at least one processing device; and
   a memory communicatively coupled to the at least one processing device, the memory storing instructions which, when executed, cause the at least one processing device to perform operations comprising:
   (i) identifying, by the at least one processing device and from one or more sensors and from at least one variable frequency device of a refrigeration system, operation information of one or more compressors of the refrigeration system;
   (ii) comparing, by the processing device, the operation information of the one or more compressors to an operation threshold;
   (iii) determining, by the processing device and based on the comparison, that the operation information of the one or more compressors satisfies the operation threshold;
   (iv) identifying, by the at least one processing device and from one or more sensors fluidly coupled to the refrigeration system, a value of at least one of a temperature or a pressure of a working fluid in the refrigeration system;
   (v) comparing, by the at least one processing device, the value to a fluid parameter threshold that comprises a respective temperature threshold of the working fluid that indicates a low load condition of the refrigeration system or a pressure threshold of the working fluid that indicates the low load condition of the refrigeration system;
   (vi) determining, by the at least one processing device and based on the comparison, that the value satisfies the fluid parameter threshold by being at or below the fluid parameter threshold; and
   (vii) changing, by the at least one processing device and based on the determination that the operation information of the one or more compressors satisfies the operation threshold or the value of the working fluid satisfies the fluid parameter threshold, an operation parameter of a component of the refrigeration system, increasing at least one of: a velocity of the working fluid in a piping assembly fluidly coupled to the one or more compressors or a flow rate of an oil in the piping assembly flowing into the one or more compressors.

2. The system of claim 1, wherein the operation information comprises a frequency of the one or more compressors, and changing the operation parameter comprises changing an operation speed of the one or more compressors.

3. The system of claim 2, wherein the frequency comprises a frequency of the one or more compressors over a period of time and the operation threshold comprises a frequency threshold, the operations further comprise:
   before comparing the operation information to the operation threshold, determining an average frequency of the one or more compressors over a predetermined period of time; and
   the operation of determining that the operation information satisfies the operation threshold comprises determining that the average frequency of the one or more compressors is below the frequency threshold.

4. The system of claim 2, wherein the piping assembly comprises a suction line fluidly coupled to a fluid inlet of the one or more compressors, the operations further comprising:
   opening, by the processing device and based on the determination that the value of the working fluid satisfies the fluid parameter threshold, at least one of a liquid injection valve in fluid communication with the suction line or a gas injection valve in fluid communication with the suction line, changing the temperature of the working fluid in a superheated state.

5. The system of claim 4, wherein the indication of the low load condition is in the suction line.

6. The system of claim 2, wherein the piping assembly comprises a suction line fluidly coupled to a fluid inlet of the one or more compressors, the operations further comprising, after changing the operation parameter:
identifying, by the at least one processing device and from one or more sensors fluidly coupled to the suction line, fluid information comprising the value of at least one of the temperature of the pressure of the working fluid in the suction line;
comparing, by the at least one processing device, the value of the working fluid to the fluid parameter threshold;
determining, by the at least one processing device and based on the comparison, that the value of the working fluid does not satisfy the fluid parameter threshold; and
upon determining that the value of the working fluid does not satisfy the fluid parameter threshold, repeating the operations (i) through (vii).

7. The system of claim 1, wherein the piping assembly comprises a suction line fluidly coupled to the one or more compressors, and changing the operation parameter comprises changing a pressure set point of at least one of a flash tank of the refrigeration system or a gas cooler of the refrigeration system, increasing the velocity of the working fluid flowing in the suction line.

8. The system of claim 7, wherein the operations further comprise, after changing the operation parameter:
identifying, by the at least one processing device and from one or more sensors of the refrigeration system, a discharge air temperature of an evaporator of the refrigeration system;
comparing, by the at least one processing device, the discharge air temperature to a discharge air temperature threshold;
determining, by the at least one processing device and based on the comparison, that the discharge air temperature satisfies the discharge air temperature threshold; and
upon determining that the value of the working fluid satisfies the fluid parameter threshold, repeating the operations (i) through (vii).

9. The system of claim 7, wherein the operations further comprise, after changing the operation parameter:
identifying, by the at least one processing device and from one or more sensors of the refrigeration system, a discharge air temperature of an evaporator of the refrigeration system;
comparing, by the at least one processing device, the discharge air temperature to a discharge air temperature threshold;
determining, by the at least one processing device and based on the comparison, that the discharge air temperature does not satisfy the discharge air temperature threshold; and
resetting, by the at least one processing device, a timer of the refrigeration system, the at least one processing device configured to repeat the operations (i) through (vii) after a predetermined period of time indicated by the timer.

10. The system of claim 7, wherein the operation of changing the pressure set point comprises lowering the pressure set point of the flash tank or increasing the pressure set point of the gas cooler, increasing the velocity of the working fluid in the suction line.

11. The system of claim 1, wherein the piping assembly comprises a suction line fluidly coupled to the one or more compressors, and the operation of changing the operation parameter comprises changing a suction set point of the refrigeration system, increasing the velocity of the working fluid flowing in the suction line.

12. The system of claim 1, wherein the operation of increasing the velocity of the working fluid comprises increasing a flow rate of oil return into the one or more compressors.

13. The system of claim 1, wherein the piping assembly extends from one or more evaporators of the refrigeration system to the one or more compressors, and the operation of changing the operation parameter comprises changing the operation parameter to increase the velocity of the working fluid in the piping assembly flowing from the one or more evaporators to the one or more compressors.

14. The system of claim 13, wherein the piping assembly comprises a low temperature suction line and a medium temperature suction line, the one or more compressors comprises a group of low temperature compressors and a group of medium temperature compressors, and the one or more evaporators comprises a group of low temperature evaporators fluidly coupled, through the low temperature suction line, to the group of low temperature compressors and a group of medium temperature evaporators fluidly coupled, through the medium temperature suction line, to the group of medium temperature compressors, and the operation of changing the operation parameter comprises changing the operation parameter to increase the velocity of the working fluid in at least one of the low temperature suction line of the medium temperature suction line.

15. The system of claim 14, wherein the low temperature suction line comprises a heat exchanger coil disposed inside a flash tank, the low temperature suction line comprises a uniform diameter, and the operation of changing the operation parameter comprises changing the operation parameter to increase the velocity of the working fluid flowing in the low temperature suction line from the heat exchanger coil to the group of low temperature compressors.

16. The system of claim 1, wherein the operation information comprises an oil level in an oil separator fluidly coupled to the one or more compressors, and the operation threshold comprises an oil level of the oil separator under the low load condition of the refrigeration system.

17. A refrigeration system comprising:
one or more compressors;
one or more variable frequency drives coupled to the one or more compressors;
one or more evaporators;
a piping assembly fluidly coupled to and interconnecting the one or more compressors to the one or more evaporators;
a working fluid configured to flow in the piping assembly from the one or more evaporators to the one or more compressors;
one or more sensors fluidly coupled within the refrigeration system, the one or more sensors configured to sense fluid information comprising at least one parameter of the working fluid in the refrigeration system; and
a controller operatively coupled to the one or more variable frequency drives and the one or more sensors, the controller configured to perform operations comprising:
(i) identifying, from the one or more sensors and from the one or more variable frequency drives, operation information of one or more compressors;
(ii) comparing the operation information of the one or more compressors to an operation threshold;

(iii) determining, based on the comparison, that the operation information of the one or more compressors satisfies the operation threshold;
(iv) identifying, from the one or more sensors fluidly coupled to the refrigeration system, a value of at least one of a temperature or a pressure of the working fluid in the refrigeration system;
(v) comparing, the value to a fluid parameter threshold that comprises a respective temperature threshold of the working fluid that indicates a low load condition of the refrigeration system or a pressure threshold of the working fluid that indicates the low load condition of the refrigeration system;
(vi) determining, based on the comparison, that the value satisfies the fluid parameter threshold by being at or below the fluid parameter threshold; and
(vii) changing, based on the determination that the operation information of the one or more compressors satisfies the operation threshold or the value of the working fluid satisfies the fluid parameter threshold, an operation parameter of a component of the refrigeration system, increasing at least one of: a velocity of the working fluid in the piping assembly fluidly coupled to the one or more compressors or a flow rate of an oil in the piping assembly flowing into the one or more compressors.

18. The refrigeration system of claim 17, wherein the piping assembly comprises a suction line fluidly coupled to a fluid inlet of the one or more compressors, and the operations further comprise:
opening, based on the determination that the value of the working fluid satisfies the fluid parameter threshold, at least one of a liquid injection valve in fluid communication with the suction line or a gas injection valve in fluid communication with the suction line, changing the temperature of the working fluid in a superheated state;

after changing the operation parameter, identifying, from the one or more sensors fluidly coupled to the suction line, fluid information comprising the value of at least one of the temperature of the pressure of the working fluid in the suction line;
comparing, the value of the working fluid to the fluid parameter threshold;
determining, based on the comparison, that the value of the working fluid does not satisfy the fluid parameter threshold; and
upon determining that the value of the working fluid does not satisfy the fluid parameter threshold, repeating the operations (i) through (vii).

19. The refrigeration system of claim 17, further comprising a receiver tank fluidly coupled to the suction line of the one or more compressors, the operation of changing the operation parameter comprises changing a pressure set point of at least one of the receiver tank, increasing the velocity of the working fluid flowing in the suction line.

20. The refrigeration system of claim 19, wherein the operations further comprise, after changing the operation parameter:
identifying, from the one or more sensors of the refrigeration system, a discharge air temperature of the one or more evaporators;
comparing the discharge air temperature to a discharge air temperature threshold;
determining, based on the comparison, that the discharge air temperature satisfies the discharge air temperature threshold; and
upon determining that the value of the working fluid satisfies the fluid parameter threshold, repeating the operations (i) through (vii).

* * * * *